(12) United States Patent
Hunter et al.

(10) Patent No.: US 9,843,249 B2
(45) Date of Patent: Dec. 12, 2017

(54) MAGNETIC POSITION COUPLING AND VALVE MECHANISM

(71) Applicant: Nucleus Scientific Inc., Cambridge, MA (US)

(72) Inventors: Ian W. Hunter, Lincoln, MA (US); George C. Whitfield, Winchester, MA (US)

(73) Assignee: Nucleus Scientific Inc., Cambridge, MA (US)

( * ) Notice: Subject to any disclaimer, the term of this patent is extended or adjusted under 35 U.S.C. 154(b) by 272 days.

(21) Appl. No.: 14/683,291

(22) Filed: Apr. 10, 2015

(65) Prior Publication Data

US 2015/0303784 A1 Oct. 22, 2015

Related U.S. Application Data

(60) Provisional application No. 61/980,191, filed on Apr. 16, 2014.

(51) Int. Cl.

| | |
|---|---|
| *H02K 41/02* | (2006.01) |
| *H02K 41/03* | (2006.01) |
| *H02K 7/10* | (2006.01) |
| *H02K 7/14* | (2006.01) |
| *H02K 9/19* | (2006.01) |
| *H02K 16/02* | (2006.01) |
| *F04D 3/02* | (2006.01) |

(52) U.S. Cl.
CPC ............ *H02K 41/031* (2013.01); *H02K 7/10* (2013.01); *F04D 3/02* (2013.01); *H02K 7/14* (2013.01); *H02K 9/19* (2013.01); *H02K 16/02* (2013.01)

(58) Field of Classification Search
CPC ........ H02K 41/03; H02K 41/02; H02K 41/00; B03C 1/288
USPC ......................................... 310/52, 57, 58, 59
See application file for complete search history.

(56) References Cited

U.S. PATENT DOCUMENTS

| | | | | |
|---|---|---|---|---|
| 6,137,195 A | * | 10/2000 | Chitayat | A61M 1/34 310/12.24 |
| 7,252,053 B2 | | 8/2007 | Froeschle et al. | |
| 2003/0102723 A1 | * | 6/2003 | Korenaga | G03F 7/70758 310/12.24 |
| 2008/0272869 A1 | | 11/2008 | Takayama et al. | |
| 2010/0253930 A1 | * | 10/2010 | Ito | G03B 27/58 355/72 |
| 2011/0080060 A1 | | 4/2011 | Camacho | |

(Continued)

FOREIGN PATENT DOCUMENTS

WO 2014/172401 10/2014

*Primary Examiner* — Hanh Nguyen
*Assistant Examiner* — Leda Pham
(74) *Attorney, Agent, or Firm* — Occhiuti & Rohlicek LLP (57) ABSTRACT

An apparatus including an array of coils wherein each coil of the array of coils is wound around a core region for containing a fluid; an external magnet assembly mounted outside of the array of coils and movable over the array of coils; and an internal magnet assembly mounted inside the core region around which the coils of the array of coils are wound, wherein the internal magnet assembly is aligned with and magnetically coupled to the external magnet assembly so that the external and internal magnet assemblies move together along the array of coils in response drive signals applied to the coils within the array of coils.

22 Claims, 7 Drawing Sheets

(56) References Cited

U.S. PATENT DOCUMENTS

2011/0193425 A1\* 8/2011 Hiura .................. H02K 41/031
                                                                  310/12.01

\* cited by examiner

MAGNETIC POSITION COUPLING AND VALVE MECHANISM

CROSS REFERENCE TO RELATED APPLICATION

This application claims the benefit under 35 U.S.C. 119(e) of Provisional Application Ser. No. 61/980,191, filed Apr. 16, 2014, entitled "Magnetic Position Coupling and Valve Mechanism," the entire contents of which are incorporated herein by reference.

TECHNICAL FIELD

The invention relates generally to electromagnetic actuators, and more specifically to permanent magnet actuators, e.g. linear actuators.

BACKGROUND

In general, linear actuators are used to generate motion in a straight line. One class of linear actuator is the electromagnetic linear actuator or linear motor, one example of which is described in the earlier filed patent application, U.S. Pat. Pub. 2014/0312716, the contents of which are incorporated herein by reference. In its most basic form, the linear actuator described therein includes a linear array of coils wound around a core of magnetically permeable material and an actuator assembly encircling the array of coils. The actuator assembly, which includes a stack of ring magnets made of a permanent magnetic material, is arranged to move back and forth along the length of the array of coils under the control of signals that are applied to the coils. By applying appropriate drive signals to coils within the array, the position and movement of the actuator assembly along the linear array of coils and the force that the actuator assembly exerts can be controlled.

Linear actuators have numerous industrial and consumer product applications. One popular use is in robotic systems in which they might function to control the movement of jointed arms or manipulators. The linear actuator can operate the jointed arm causing it to move an object from an initial position to another fixed position at a controllable speed and causing it to hold the object in the fixed position. Typically, however, holding the object in a fixed position requires the continuing supply of power to the linear actuator to enable it to resist the pull of gravity on the object. If the power is interrupted, the linear actuator relaxes and gravity pulls the object down. As a consequence, when the source of power is limited, such as in the case of batteries, having to hold the object in its fixed position will drain power from the battery.

Thus, it is desirable to provide a mechanism that can be used to, among other things, hold the actuator assembly in a fixed position and eliminate, or at least reduce, the drain on the power supply.

SUMMARY

In general, this application describes an alternative and novel approach to "locking" the actuator assembly within a linear actuator in a fixed position.

Magnetically coupled shuttle and valve mechanisms are described, including one or more of the following features:
1. A position coupling mechanism for coupling the position of two co-located magnet assemblies along a single axis of motion, wherein magnetic forces between the two assemblies drive the relative position of the two assemblies to remain constant as the position of either of either magnet assembly is varied.
2. Application of a single position coupling mechanism to transfer force from sources external to a linear actuator to components internal to the actuator, across the environmentally sealed wall of the actuator.
3. Application of two or more position coupling mechanisms to control the relative position of two magnet assemblies internal to the linear actuator, thereby opening or closing a mechanical valve or switch mechanism internal to the linear actuator.
4. The inclusion of a mechanical spring return mechanism that drives the two position coupling mechanisms to remain in a specific relative position.

In general, in one aspect, the invention features an apparatus including: an array of coils wherein each coil of the array of coils is wound around a core region for containing a fluid; an external magnet assembly mounted outside of the array of coils and movable over the array of coils; and an internal magnet assembly mounted inside the core region around which the coils of the array of coils are wound, wherein the internal magnet assembly is aligned with and magnetically coupled to the external magnet assembly so that the external and internal magnet assemblies move together along the array of coils in response drive signals applied to the coils within the array of coils.

Preferred embodiments include one or more of the following features. The apparatus includes a conduit defining the core region and around which the coils of the array of coils are wound. The conduit is a cylinder establishing a fluid impermeable wall. The apparatus also includes a valve mechanism within the internal magnet assembly for blocking and unblocking a flow of fluid through the conduit, the valve mechanism magnetically controlled by signals applied to coils of the array of coils. The apparatus might also include an external fluid circuit defining a closed-loop fluid path connecting one end of the conduit with another end of the conduit; and an electronically operated valve mechanism located outside of the conduit and within the external fluid circuit, the valve mechanism operable to block and unblock a flow of fluid within the external fluid circuit. The apparatus might also include a valve mechanism within the internal magnet assembly for blocking and unblocking a flow of fluid through the conduit, the valve mechanism magnetically controlled by signals applied to coils of the array of coils.

Preferred embodiments might further include one or more of the following features. The external magnet assembly includes an array of external ring magnets, each ring magnet of the array of external ring magnets encircling the array of coils. The ring magnets of the array of external ring magnets are grouped to form a first sub-array of external ring magnets and a second sub-array of external ring magnets, the first and second sub-arrays of external ring magnets being separately movable along the array of coils under control of signals applied to the coils of the array of coils. The internal magnet assembly includes an array of internal ring magnets aligned with the array of external ring magnets. The ring magnets of the array of internal ring magnets are grouped to form a first sub-array of internal ring magnets and a second sub-array of internal ring magnets, the first and second sub-arrays of internal ring magnets being separately movable within the core region under control of signals applied to the coils of the array of coils. The first sub-array of external ring magnets and the first sub-array of internal ring magnets are magnetically coupled and move together and wherein the second sub-array of external ring magnets and the second sub-array of internal ring magnets are magnetically coupled and move together. The apparatus further includes a valve mechanism for controlling a flow of fluid through the internal magnet assembly and operated by a movement of the first and second sub-arrays of internal ring magnets relative to each other. The ring magnets within the external array of ring magnet have magnetic fields selected and arranged to enhance a magnetic field produced by the external array of magnets within the coils of the array of coils relative to a field radially outside of the external array of ring magnets. The ring magnets within the internal array of ring magnets have magnetic fields selected and arranged to enhance a magnetic field produced by the internal array of magnets within the coils of the array of coils relative to a field radially inside of the internal array of ring magnets. The apparatus also includes a shuttle within the conduit, the shuttle including the internal magnet assembly and wherein the shuttle blocks the conduit so that fluid cannot pass through the conduit from one side of the shuttle to another side of the shuttle. The apparatus further includes an actuator assembly that includes the external magnet assembly and is for mechanically operating another element in response to of signals applied to the coils in the array of coils.

In general, in another aspect, the invention features a linear actuator including: a cylinder having a fluid impermeable wall; an array of coils, wherein each coil of the array of coils is wound around the cylinder; and an actuator assembly including an array of external ring magnets and an array of internal ring magnets, each ring magnet of the array of external ring magnets encircling the array of coils and each ring magnet of the array of internal ring magnets located within the cylinder, and wherein the array of internal ring magnets is magnetically coupled with the array of external ring magnets so that the arrays of external and internal ring magnets move together along the array of coils in response drive signals applied to the coils within the array of coils.

The details of one or more embodiments of the inventions are set forth in the accompanying drawings and the description below. Other features, objects, and advantages of the inventions will be apparent from the description and drawings, and from the claims.

DESCRIPTION OF THE DRAWINGS

FIGS. 7A-C are cross-sectional views of the valve mechanism that is within the internal magnet assembly or shuttle depicted in FIG. 6. FIG. 7A shows the valve mechanism in an open position, FIG. 7B shows the fluid flow paths through the open valve mechanism, and FIG. 7C show the valve mechanism in a closed position.

Note that like components and features in the drawings may be identified by the same numbers.

DETAILED DESCRIPTION

Figure 1A:
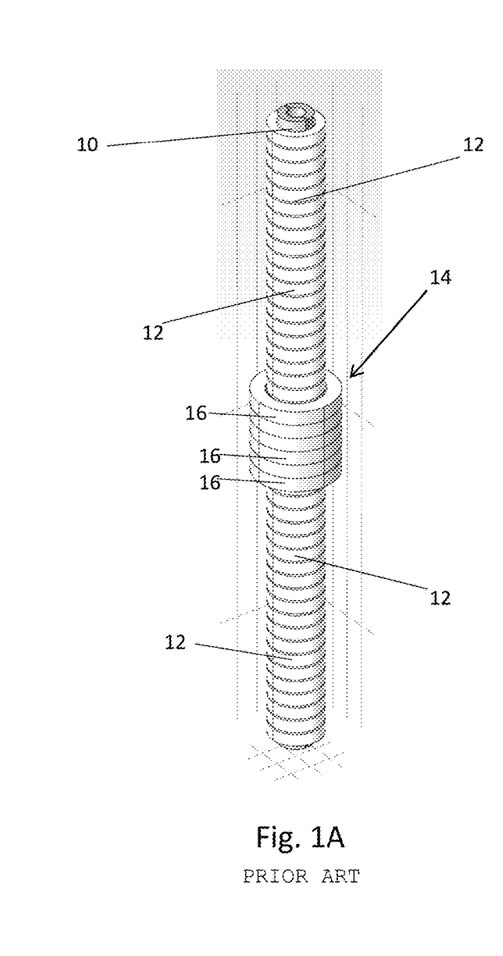
FIGS. 1A and 1B show a 3D view of a conventional linear actuator with an expanded cross-sectional view of the actuator assembly.
Figure 1B:
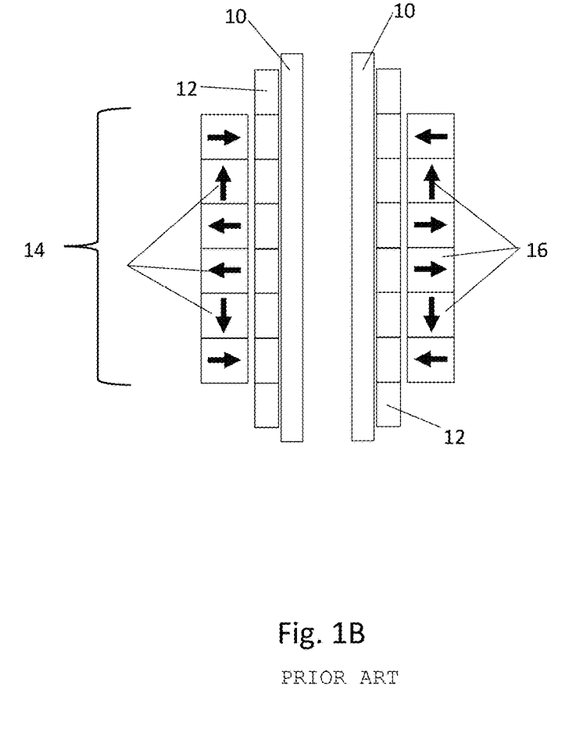

The embodiments described herein are linear actuators modified to include one or more internal shuttle elements. A basic, unmodified linear actuator is described in the previously mentioned U.S. Pat. Pub. 2014/0312716. Referring to FIGS. 1A and 1B, the linear actuator includes a split core 10 having two segments made of soft ferromagnetic material, e.g. a relatively high magnetic permeability as compared to air, and low coercivity such as iron or steel or mu-metal. The two core segments are halves of a cylinder which when put side-by-side form a cylinder with a hollow central core region 11 extending along the longitudinal axis of the core.

Assembled onto the core 10 is a stack of identical coils 12 arranged adjacent to each other to form a linear coil array. They are adjacent in that they are next to each other, either touching or separated by a small distance. In this example, the coils all have the same orientation relative to the core, i.e., they are wound in the same direction about the core. However, this need not be the case; the winding directions can alternate or be arranged in some other order depending on design requirements.

Arranged on the linear coil array is an actuator assembly 14 that includes a stack of ring magnets 16 (i.e., ring-shaped magnets) forming a magnet array. In the described embodiment, this magnet array is made up of a stack of six, adjacently arranged, ring magnets 16. Each ring magnet 16 is coaxially arranged on and circumscribes the coil array. The magnet array is mechanically held together within the actuator assembly 14, which is able to move back and forth along the length of the coil array (and the core) in response to forces imposed on the magnet array by currents applied to the underlying coils. That is, it is movably mounted with respect to the coil array, where movably mounted is meant to cover the case in which the magnet array is able to move along the coil array and core, if the array and core are held fixed, and the case in which the coil array is able to move relative to the magnet array, if the magnet array is held fixed.

The ring magnets 16, which are permanent magnets, e.g. rare earth magnets such as neodymium-iron-boron magnets, have their polarities arranged as indicated in FIG. 1B to achieve results similar to those achieved by a Halbach array. More specifically, the six ring magnets 16 are arranged to augment the magnetic field on one side of the magnet array (i.e., in the coils) while reducing the field on the other side of the magnet array. The six ring magnets are arranged to form two magnetic circuits, i.e., two magnetic field loops. In FIG. 1B, the top three ring magnets form a first magnetic circuit and the bottom three ring magnets form a second magnetic circuit.

In the first magnetic circuit, the magnetic field in the uppermost ring magnet is oriented radially inward; the magnetic field in the middle ring magnet is oriented upward and parallel to the axis of the coil array; and the magnetic field in the lowermost ring magnet is oriented radially outward. It is a single magnetic circuit because the arrangement of magnets generates a magnetic field that forms one loop. The polarities of three ring magnets are arranged so as to reduce (e.g. partially cancel) the field outside of the magnet array while enhancing the field on the inside of the magnet array, i.e., in the vicinity of the windings of the coils.

The arrangement of magnet polarities in the bottom circuit is the mirror image of the arrangement of the magnet polarities in the top circuit (i.e., a mirror image relative to a plane perpendicular to the axis of the coil array). In this six-magnet configuration, the magnetic moment is radially oriented in the same direction over the two ring widths at the center of the actuator assembly. This increases the continuous region of the coil array over which a radially oriented magnetic field that is perpendicular to the coil current is generated.

Of course, the linear actuator could be constructed using a single magnetic circuit or more than two magnetic circuits.

When a current is applied to a coil 12 that is located in a region of the coil array that is encircled by the actuator assembly 14, the interaction of the circumferential current within the coil and the radially directed magnetic field produced by the array of magnets 16 generates a force vector (the Lorentz force) that is parallel to the longitudinal axis of the coil array. Depending on the polarity of the current and the direction of the magnetic field, this will cause the magnet assembly to move along the longitudinal axis of the assembly in either one direction or the other. And that mechanical movement of the magnet assembly (or actuator) (in this embodiment and in the other embodiments described herein) can be used to drive or control another device, such as a robotic element.

Figure 2A:
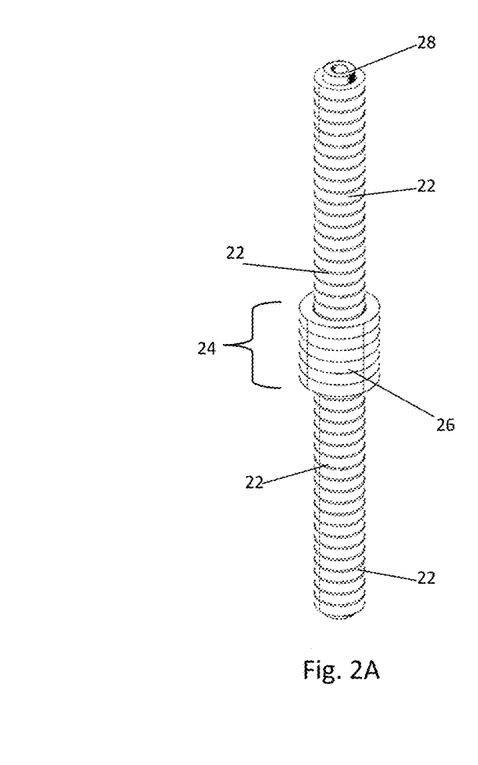
FIGS. 2A and 2B show a 3D view of a linear actuator which embodies the invention with an expanded cross-sectional view of a position coupling mechanism within the actuator assembly.
Figure 2B:
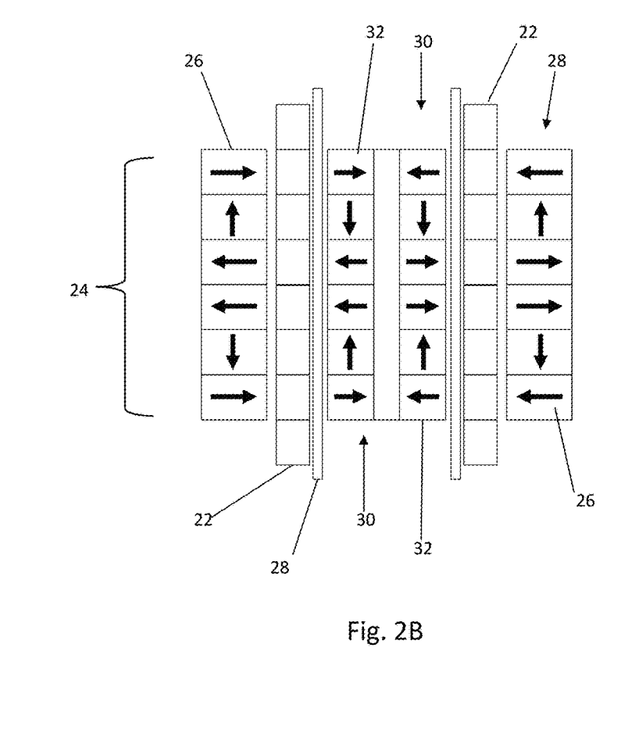

A modified linear actuator that incorporates a position coupling mechanism is illustrated in FIGS. 2A and 2B. As with the basic linear actuator described above, it includes a linear array of coils 20 with an external magnet assembly 24 surrounding the coils. The external magnet assembly 24 includes an array of six ring magnets 26 arranged next to each other along the length of and surrounding the outside of the coil array 20. However, unlike the previously described design of the basic linear actuator, this linear actuator does not have a magnetically permeable core. Instead, it includes an environmentally sealed cylinder 28 inside of which there is an internal magnet assembly (or shuttle) 30 made up of a second array of ring magnets 32 aligned with and magnetically coupled to the first array of ring magnets 26 that are surrounding the outside of the coils. A position coupling mechanism is created by co-locating the two magnet assemblies 24 and 30 along the axis of motion of the linear actuator.

The ring magnets within each magnet assembly 24 and 30 are magnetized in a pattern that causes a focused magnetic flux to preferentially exit from and return to the assembly along a single face, e.g. as can be achieved through use of a Halbach or modified Halbach array. Furthermore, the magnets within the internal magnet assembly 30 are magnetized in a pattern that achieves minimal magnetic reluctance when placed in close proximity to the external magnet assembly 24, along the actuator assembly's linear axis of motion. As a consequence, the total magnetic energy of the system is minimized when the external and internal magnet assemblies 24 and 30 are in closest proximity to and aligned with one another.

In the described embodiment, this is accomplished by arranging the polarities of the magnets within the two magnet assemblies 24 and 30 as indicated in FIG. 2B. The external magnet assembly 24 has six ring magnets 26 arranged in the manner previously described to form two magnetic circuits, a first magnetic circuit formed by the top three ring magnets 26 and a second magnetic circuit formed by the bottom three ring magnets 26. In the first magnetic circuit, the magnetic field in the uppermost ring magnet is oriented radially inward, the magnetic field in the middle ring magnet is oriented upward and parallel to the axis of the coil array; and the magnetic field in the lowermost ring magnet is oriented radially outward. In the second magnetic circuit, the arrangement of magnet polarities of the ring magnets is the mirror image of the arrangement of the magnet polarities in the top circuit (i.e., a mirror image relative to a plane perpendicular to the axis of the coil array). That is, the magnetic field in the uppermost ring magnet is oriented radially outward, the magnetic field in the middle ring magnet is oriented downward and parallel to the axis of the coil array; and the magnetic field in the lowermost ring magnet is oriented radially inward.

In the case of the internal magnet assembly 30, each magnetic circuit has its ring magnets 32 arranged to enhance the magnetic field outside of the assembly 30 and in the region of the surrounding coils and to decrease the magnetic field in the axial region of the core. The internal magnet assembly 30 also has six ring magnets 32 arranged to form two magnetic circuits, a first magnetic circuit formed by the top three ring magnets and a second magnetic circuit formed by the bottom three ring magnets. In the first magnetic circuit, the magnetic field in the uppermost ring magnet is oriented radially inward, the magnetic field in the middle ring magnet is oriented downward and parallel to the axis of the coil array; and the magnetic field in the lowermost ring magnet is oriented radially outward. In the second magnetic circuit, the arrangement of magnet polarities of the ring magnets is the mirror image of the arrangement of the magnet polarities in the top circuit. That is, the magnetic field in the uppermost ring magnet is oriented radially outward, the magnetic field in the middle ring magnet is oriented upward and parallel to the axis of the coil array; and the magnetic field in the lowermost ring magnet is oriented radially inward.

The ring magnets in the internal magnet assembly 30, the ring magnets in the external magnet assembly 24, and the coils 22 in the coil array 20 all have the same height or thickness as measured along the axis of the coil array 20. Thus, when one ring magnet of either magnet assembly is aligned with a neighboring coil, all of the other ring magnets of that array are also aligned with corresponding neighboring coils. This, however, is not a requirement. The coils can have a different height from that of the ring magnets. For example, it has been found that choosing a magnet ring width of 1.5 times the width of the coil (i.e., that two magnet rings span three coils in the coil array) can have advantages when it comes to driving the coils to control movement of the magnet assembly.

Figure 3A:
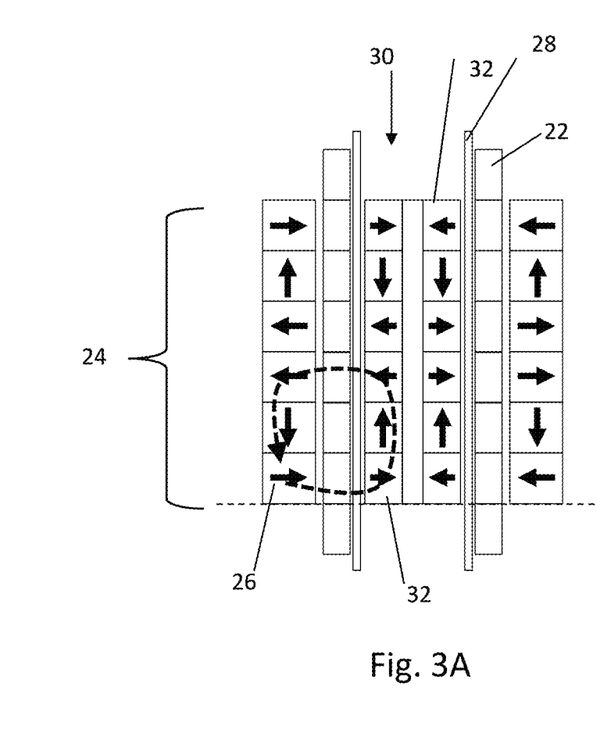
FIGS. 3A and 3B show two configurations of the position coupling mechanism: (1) one with zero displacement between magnet assemblies (FIG. 2A) and (2) with positive displacement between the magnet assemblies (FIG. 2B).
Figure 3B:
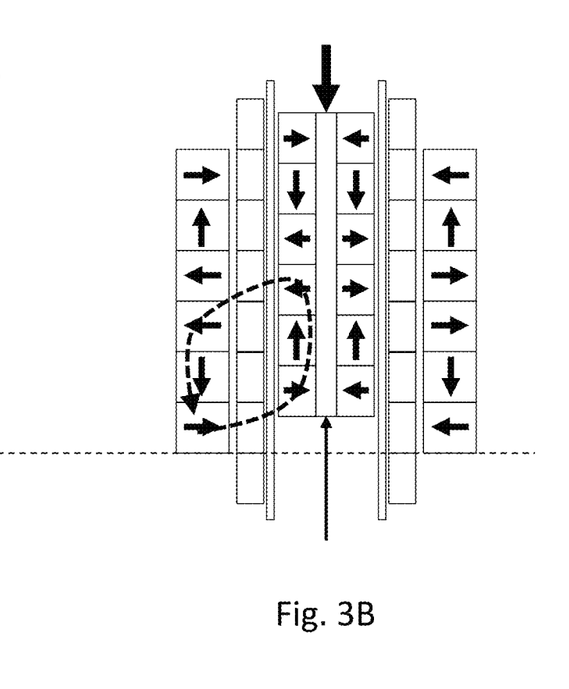

As noted, the total magnetic energy of the system is minimized when the two magnet assemblies remain aligned with each other and in close proximity, which corresponds to the equilibrium relative position of the two magnet assemblies. For this reason, the force applied to one magnet assembly will be reversibly transmitted to the second magnet assembly. In addition, if one magnet assembly is forcibly displaced from its equilibrium relative position with respect to the other magnet assembly, it will experience a restoring force that drives it to return to the equilibrium relative position. The displacement and resultant restoring force are depicted in FIGS. 3A and 3B which show two configurations of the position coupling mechanism: (1) one with zero displacement between the two magnet assemblies 24 and 30

(FIG. 3A) and (2) with positive displacement between the magnet assemblies 24 and 30 (FIG. 3B). In both cases, magnetic flux is shown schematically to follow a path of minimal reluctance between the two magnet assemblies 24 and 30 (see the dashed path with arrow). In the case of positive displacement (FIG. 3B), the path length of the magnetic field is increased, commensurate with an increase in reluctance and total magnetic energy of the system. Consequently, a restoring force in the negative direction is experienced by the internal magnet assembly, driving the two magnet assemblies to return to their equilibrium relative position.

Within a limited range of displacement, the restoring force will increase monotonically as displacement from the equilibrium relative position is also increased. In this manner, the transmission of force from one magnet assembly to the other can be described to occur by means of a magnetic spring element that joins the two magnet assemblies together at the equilibrium relative position, thereby forming the position coupling mechanism.

The position coupling mechanism can be used to transfer force between the external magnet assembly 24 and the internal magnet assembly 30. In addition, the internal magnet assembly 30 can be driven to move back and forth along the length of the linear actuator, following the position of the external magnet assembly 24. This movement of the internal magnet assembly 30, whether induced by forces applied by the actuator's coils 22 or by external forces on the external magnet assembly 24, can be in turn transmitted to other mechanical components internal to the linear actuator.

Figure 4:
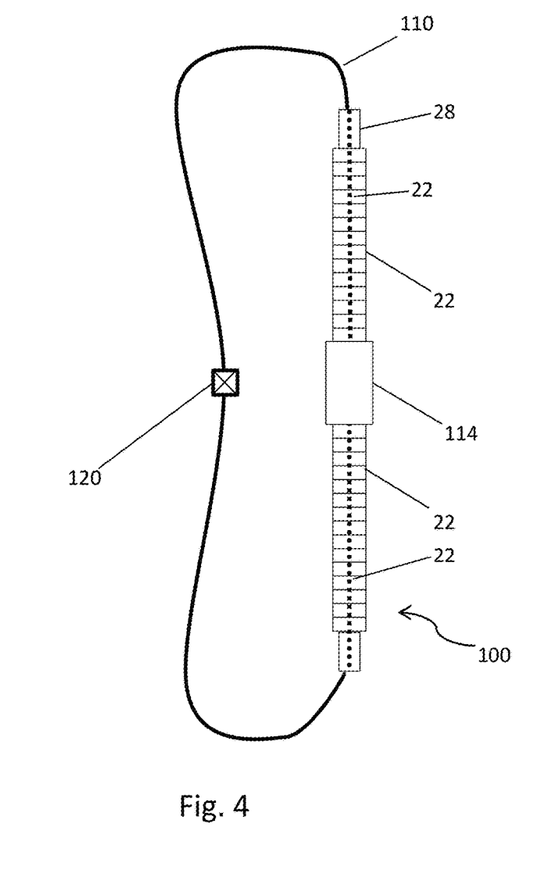
FIG. 4 shows a schematic representation of a linear actuator connected to a fluidic circuit that runs through the core of the actuator

FIG. 4 shows an embodiment in which this force is transmitted to a fluid contained within the linear actuator 100 and transmitted to an external fluidic circuit 110. The linear actuator 100 has a moving actuator assembly 114 that is made up of an external magnet assembly magnetically coupled to an internal magnet assembly that forms a shuttle within the sealed tube 28 (e.g. see FIG. 2B). In this case, the shuttle blocks any flow of the fluid through the linear actuator. The external fluidic circuit 110, which is also a sealed circuit, extends from one end of the environmentally sealed tube of the linear actuator 100 to the other end of that environmentally sealed tube and establishes a flow path for the fluid within the system. The connections between the external fluidic circuit 110 and the sealed tube 28 are fluid tight connections. The external fluidic circuit 110 also contains an external valve mechanism 120 that is inline with the fluid flow path and external to the linear actuator 100.

When the external valve 120 is open, fluid is able to flow freely back and forth through the fluidic circuit 110, and the magnet assembly 114 effectively shuttles (pushes) fluid back and forth within the fluidic circuit 110. When the external valve 120 is closed, fluid is prevented from flowing through the external fluidic circuit 110, and the fluid in the fluidic circuit 110 opposes any force applied by the shuttle within the actuator assembly 114. By means of the position coupling mechanism, this opposing force will be transmitted from the internal magnet array to the external magnet array through the effective magnetic spring element to the external magnetic assembly, and any external forces applied to the magnetic assembly 114 will also be opposed, encountering an effective stiffness intrinsic to the magnetic spring in series with the stiffness of the static fluidic circuit itself. In this manner, the closing of the valve 120 in the external fluidic circuit 110 will result in a static force opposing external motions of the magnet assembly 114. If this valve is "normally closed", then this opposing force will be applied while the linear actuator is in a state of zero electrical power dissipation. In other words, when the external valve 120 is closed, fluid cannot circulate in the fluid circuit and the actuator assembly will remain in a fixed position, held there by the magnetic forces generated on the external magnetic array by the internal magnetic array even though power to the coils has been cut off. Stated differently, no power will need to be supplied to the coils to hold the actuator assembly in a fixed position.

The effectiveness of this "locking mechanism" of course depends on the quality of the seal formed between the shuttle assembly and the inner wall of the tube 28. If fluid is able to leak past the shuttle assembly along the inner wall of the tube, the shuttle assembly will drift in response to whatever external force is being applied to the actuator assembly. The better that seal is, the better the shuttle assembly will be at holding its locked position and preventing a slow drift.

Figure 5:
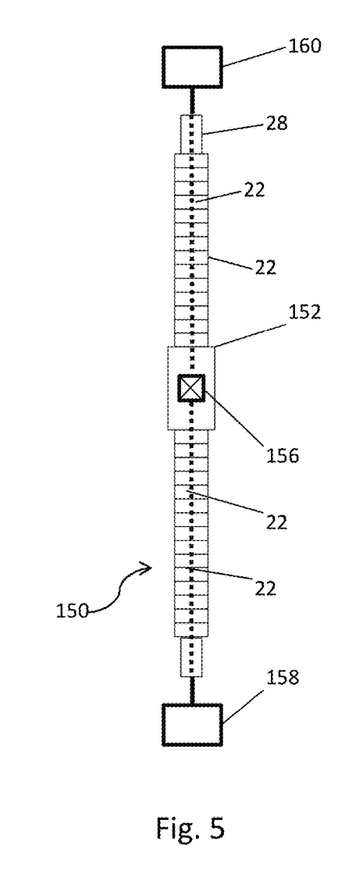
FIG. 5 shows a schematic representation of another embodiment of a linear actuator connected to a fluidic circuit that runs through the core of the actuator

FIG. 5 shows an alternative approach to that shown in FIG. 4. The system includes a linear actuator 150 with an actuator assembly 152 that moves back and forth along a linear array of coils 22. Inside of the actuator assembly 152, there is an internal valve mechanism 156 that is integral to the magnetically coupled shuttle assembly within the actuator assembly 152 (details are provided below). At both ends, the linear actuator 150 is coupled to two sealed, fluid reservoirs 158 and 160. A fluid completely fills the core region of the linear actuator 150 and the two reservoirs 158 and 160.

When the internal valve mechanism 156 is closed, fluid is prevented from flowing through the shuttle assembly. In that case, movement of the shuttle assembly and the actuator assembly 152 is inhibited or prevented by the resistance generated by the fluid in the system, which is blocked from passing through the shuttle. However, when the internal valve mechanism is open and fluid is able to flow through the shuttle, the actuator assembly 152 is free to move in either direction along the coil array. In other words, this arrangement with the internal vale mechanism provides similar functionality to that provided by the closed loop system depicted in FIG. 4 which has the external valve mechanism.

Figure 6A:
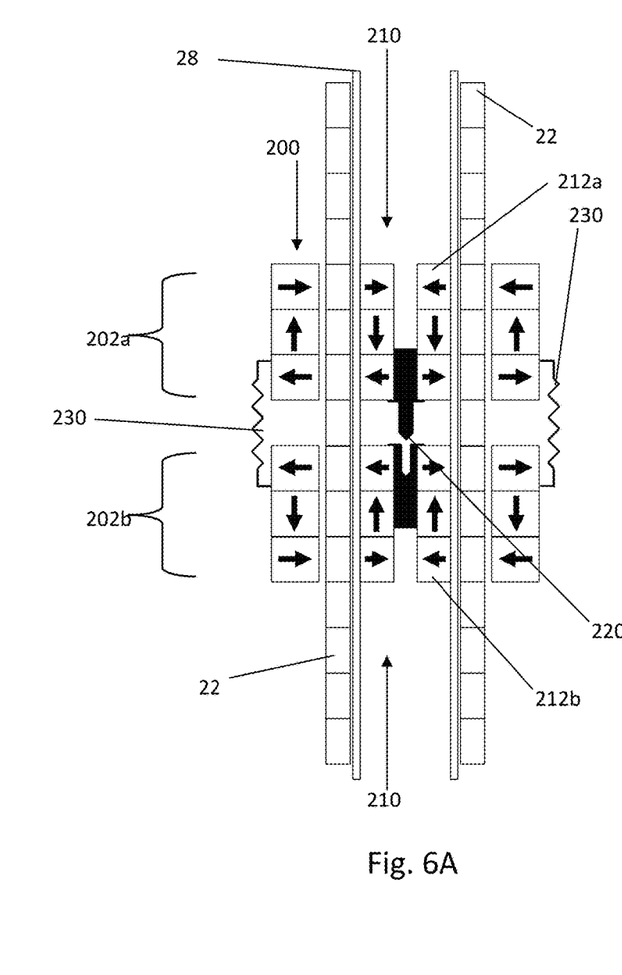
FIGS. 6A and 6B shows a valve mechanism illustrated schematically in an open and closed (right) state.
Figure 6B:
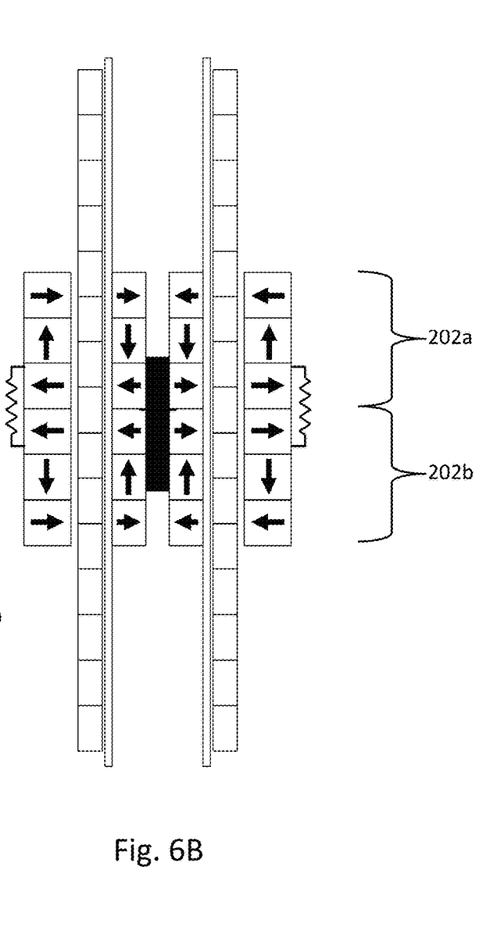

An illustrative embodiment that implements the internal valve mechanism will now be described in greater detail. Given the ability to couple the relative position of the outer magnet assembly to the inner magnet assembly via the magnetic coupling mechanism, the absolute position of the internal magnet assembly can be controlled. Extending that concept, multiple position coupling mechanisms may be used to control the relative position of multiple internal magnet sub-arrays. And using this concept, a mechanical switch or fluidic valve mechanism located internal to the linear actuator can be created, whereby the valve opens or closes in response to a change in the relative position of the two internal magnet sub-arrays. This mechanism is pictured schematically in FIGS. 6A and B.

As can be seen, each of the external and internal magnet assemblies 200 and 210, respectively, is made up of two magnet sub-arrays. The external magnet assembly 200 includes a first magnet sub-array 202a made up of three ring magnets and a second magnet sub-array 202b made up of three ring magnets. Similarly, the internal magnet assembly 210, which makes up an internal shuttle assembly, includes a first magnet sub-array 212a made up of three ring magnets and a second magnet sub-array 212b also made up of three ring magnets. In essence, each of the six ring magnet arrays within the embodiment described in connection with FIG. 2B has been split in half to form the two three ring magnet sub-arrays. Each magnet sub-array 202a and 202b in the external magnet assembly 200 can be moved independently of the other magnet sub-array and each magnet sub-array 212a and 212b in the internal magnet assembly is magnetically coupled with a corresponding one of the magnet sub-arrays of the external magnet assembly. The two magnet sub-arrays 202a and 202b in the external magnet assembly 200 (and the magnetically coupled internal magnet sub-arrays 212a and 212b) may be separated and brought together by applying appropriate control signals to the coils 22 that are adjacent to those magnet sub-arrays.

Within the internal shuttle assembly that contains the internal magnet assembly, there is a valve mechanism 220, with one part of the valve mechanism coupled to the first magnetic sub-array 212a and with the other part of the valve mechanism coupled to the second magnetic sub-array 212b. When the two magnet sub-arrays 212a and 212b are separated under control of signals applied to the coils 22, the valve mechanism 220 opens and allows the fluid within the internal circuit to flow through the shuttle via the open valve (see FIG. 6A). Conversely, when the two magnet sub-arrays 212a and 212b are forced together under control of signals applied to the coils 22 so that the magnet sub-arrays are abutting each other, the valve mechanism 220 closes and prevents the fluid within the internal circuit from flowing through the shuttle (see FIG. 6B).

Optionally, a mechanical spring return mechanism 230 can be included to force the valve mechanism 220 to return to a normally closed state, supporting the opposition of external force when the system is in a state of zero electrical power dissipation. Due to the magnetic coupling mechanism, this mechanical spring return mechanism 230 can be located externally to the linear actuator's sealed wall 28 and attached between the two magnet sub-arrays 202a and 202b of the external magnet assembly 200.

Figure 7A:
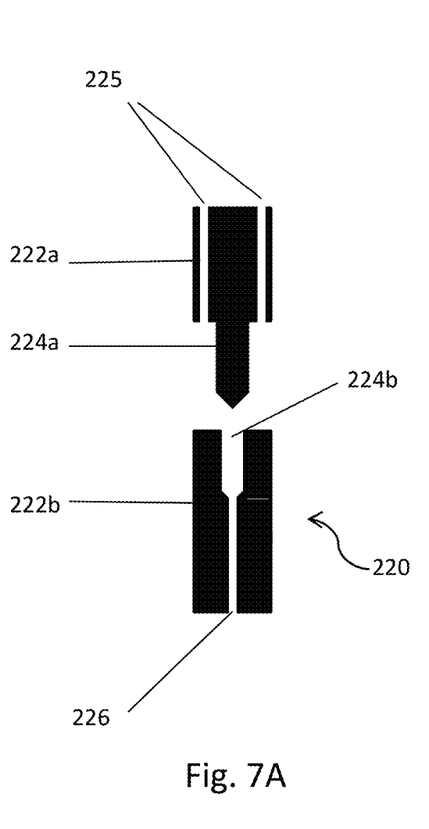
Figure 7B:
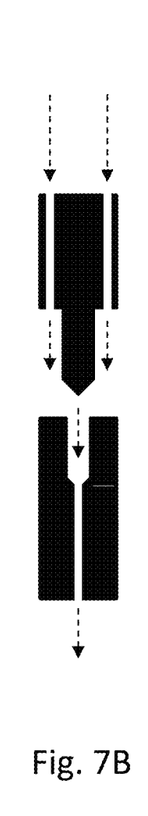
Figure 7C:
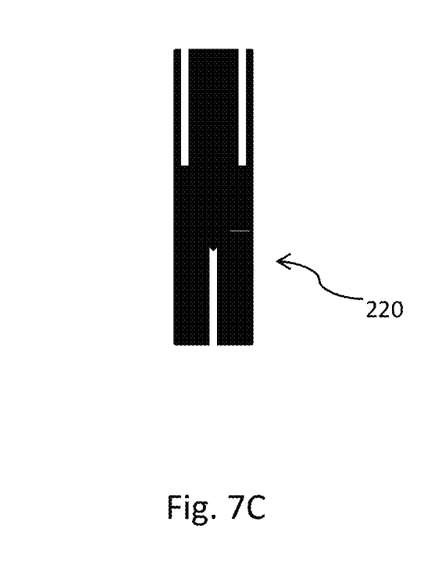

In FIGS. 7A-C, cross-sectional views show the valve mechanism 220 of the described embodiment in greater detail. It includes an upper valve segment 222a and a separate, lower valve segment 222b. The upper valve segment 222a is mounted within a channel in the upper internal magnet assembly 212a and the lower valve segment 222b is mounted within a channel in the lower internal magnet assembly 212b. The upper valve segment 222a has two flow channels 225 passing from one end to the other and creating passages through which fluid can flow when the channels are not blocked. The lower valve segment includes a single flow channel 226 also passing from one end to the other and creating another passage through which fluid can flow when that channel is not blocked.

To block the flow of fluid through the valve mechanism, the lower valve segment 222b includes a chamber 224b and the upper valve segment 222a includes a plunger 224a that has a shape that conforms with the shape of the chamber 224b. When the two valve segments 222a and 222b are separated (i.e., when the valve mechanism is open), fluid on one side of the valve mechanism is able to flow through the flow channels 225 into a cavity formed between the separated segments and then out of that cavity through the other flow channel 226 to the other side of the valve mechanism, as depicted with the dashed lines in FIG. 7B. When the two valve segments are brought together (i.e., when the valve mechanism is closed), the plunger 224a is inserted into the chamber 224b and blocks the flow channel 226 in the lower valve segment 222b, thereby preventing the flow of fluid through the valve mechanism (see FIG. 7C).

There are, of course, many alternative ways of implementing a valve mechanism that can serve to control the flow of fluid through the internal magnet assembly. The just described embodiment is simply one example.

Returning generally to the two embodiments illustrated by FIGS. 4 and 5, it should be noted that there are some key differences between those two fluidic coupling approaches. They relate to the viscous damping and mass of fluid moved when the actuator moves. In the first case (FIG. 4), when the external valve 120 is open and the actuator 114 shuttles fluid back and forth through the external circuit 110, the entire mass of fluid in the circuit is moving and experiencing a drag force against the internal walls of the circuit. In the second case (FIG. 5), when the internal valve mechanism is open, the internal magnet assembly 210 is free to move without forcing the flow of fluid through an external circuit, and the only viscous drag experienced is associated with the forced flow of fluid through the internal valve mechanism 220. Hence, it can be advantageous to move the internal magnet assembly through use of an internal valve mechanism, to avoid viscous losses and reduce inertia of the system.

Figure 8:
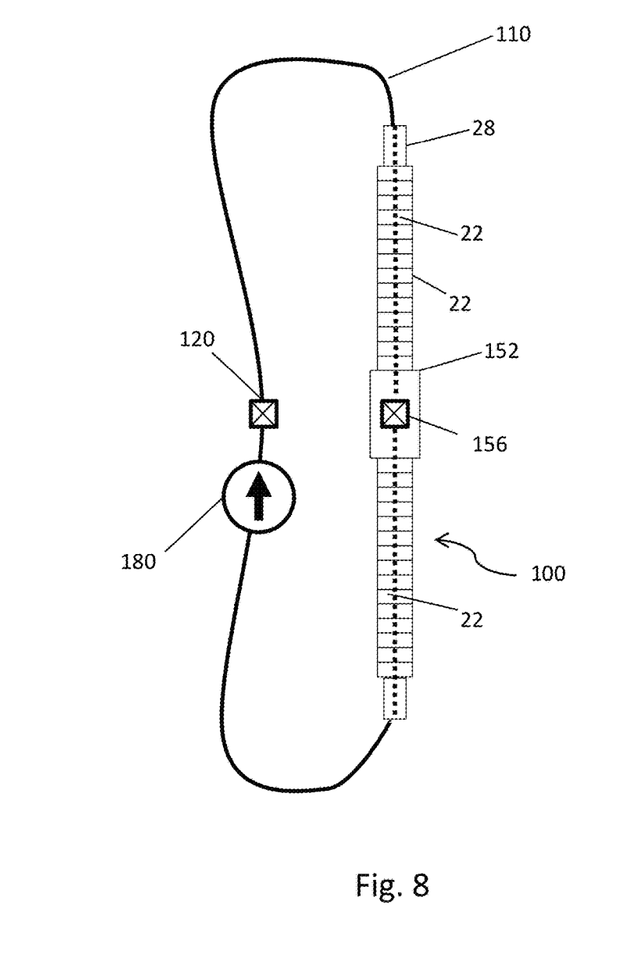
FIG. 8 shows a schematic representation of a linear actuator system that employs both internal and external valve mechanisms and an external fluidic pump.

Combining the two approaches shown in FIGS. 4 and 5, a third embodiment can be created (FIG. 8), in which both internal and external valve mechanisms 156 and 120 are included, along with an externally placed, fluidic pump 180, in a closed-loop fluid flow path. Motion of the internal magnet assembly can be opposed by closing both valves 156 and 120 and turning the fluidic pump 180 OFF. By opening the internal valve mechanism 156, motion of the internal magnet assembly is permitted, in a manner similar to the mechanism previously described. When both the internal valve mechanism 156 and external valve mechanism 120 are open and the fluidic pump 180 is flowing, an added benefit is realized in that motion of the internal magnet assembly is permitted (with relatively low damping and inertia associated with the motion itself) and fluid is being actively flowed through the internal region of the linear actuator. In this case, the fluid can be used to cool the linear actuator while the internal magnet assembly is being moved and controlled under the influence of the linear actuator coils.

Figure 9:
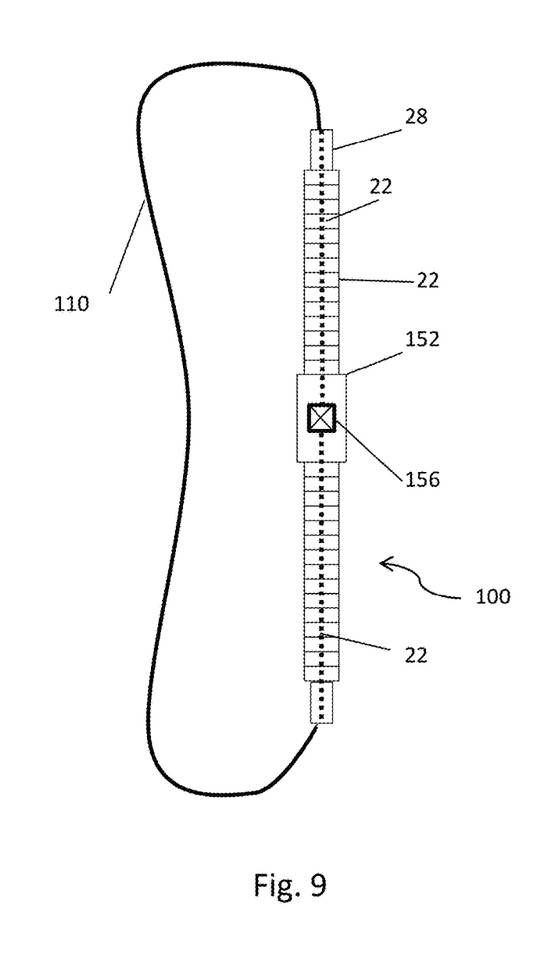
FIG. 9 shows a schematic representation of a linear actuator system that operates as a pump.

Referring to FIG. 9, an embodiment that employs the internal valve mechanism 156 within the shuttle can also be used as a pump. When the shuttle is moved in one direction (e.g. in the up direction in FIG. 8), the internal valve 156 is placed into its open position and when the shuttle is moved in the other direction (i.e., the down direction in FIG. 8), the internal valve 156 is placed in its closed position. In this way, the fluid that is in the circuit 110 can be moved around the loop in a clockwise manner. If the fluid is a coolant that serves to cool the actuator assembly, the pumping action can be used to circulate the coolant to an external heat exchanger (not shown) that is in the fluid flow path.

Other embodiments are within the following claims. For example, the ring magnets can be fabricated as solid rings or they can be fabricated by arranging an array of smaller magnets to form a ring. In addition, the sealed tube can be a separate cylinder made of a fluid impermeable material (e.g. plastic) onto which the coils are wound or arranged, as indicated above. Also, it need not be circular in shape but rather it can a conduit having another shape, e.g. rectangular or oval. Also, it might not be a separate item but rather it could be an environmentally fluid-tight wall that is formed by cementing or gluing the coils together so that their aligned inner cores form a fluid tight conduit.

What is claimed is:
1. An apparatus comprising:
 a conduit defining a core region for containing a fluid;
 an array of coils wherein each coil of the array of coils is wound around the conduit;

an external magnet assembly mounted outside of the array of coils and movable over the array of coils; and an internal magnet assembly mounted inside the conduit, wherein the internal magnet assembly is aligned with and movable relative to the external magnet assembly and wherein the internal magnet assembly is also magnetically coupled to the external magnet assembly so that the external and internal magnet assemblies move together along the array of coils in response drive signals applied to the coils within the array of coils.

2. The apparatus of claim 1, wherein the conduit is a cylinder establishing a fluid impermeable wall.

3. The apparatus of claim 1, further comprising:
a valve mechanism within the internal magnet assembly for blocking and unblocking a flow of fluid through the conduit, said valve mechanism magnetically controlled by signals applied to coils of the array of coils.

4. The apparatus of claim 1, further comprising:
an external fluid circuit defining a closed-loop fluid path connecting one end of the conduit with another end of the conduit; and
an electronically operated valve mechanism located outside of the conduit and within the external fluid circuit, said valve mechanism operable to block and unblock a flow of fluid within the external fluid circuit.

5. The apparatus of claim 4, further comprising:
a valve mechanism within the internal magnet assembly for blocking and unblocking a flow of fluid through the conduit, said valve mechanism magnetically controlled by signals applied to coils of the array of coils.

6. The apparatus of claim 1, wherein the external magnet assembly comprises an array of external ring magnets, each ring magnet of the array of external ring magnets encircling the array of coils.

7. The apparatus of claim 6, wherein the ring magnets of the array of external ring magnets are grouped to form a first sub-array of external ring magnets and a second sub-array of external ring magnets, said first and second sub-arrays of external ring magnets being separately movable along the array of coils under control of signals applied to the coils of the array of coils.

8. The apparatus of claim 7, wherein the internal magnet assembly comprises an array of internal ring magnets aligned with the array of external ring magnets.

9. The apparatus of claim 8, wherein the ring magnets of the array of internal ring magnets are grouped to form a first sub-array of internal ring magnets and a second sub-array of internal ring magnets, said first and second sub-arrays of internal ring magnets being separately movable within the conduit under control of signals applied to the coils of the array of coils.

10. The apparatus of claim 9, wherein the first sub-array of external ring magnets and the first sub-array of internal ring magnets are magnetically coupled and move together and wherein the second sub-array of external ring magnets and the second sub-array of internal ring magnets are magnetically coupled and move together.

11. The apparatus of claim 10, further comprising a valve mechanism for controlling a flow of fluid through the internal magnet assembly and operated by a movement of the first and second sub-arrays of internal ring magnets relative to each other.

12. The apparatus of claim 11, further comprising a biasing mechanism coupled to the external magnet assembly and for biasing the valve mechanism in a closed state.

13. The apparatus of claim 6, wherein the ring magnets within the external array of ring magnet have magnetic fields selected and arranged to enhance a magnetic field produced by the external array of magnets within the coils of the array of coils relative to a field radially outside of the external array of ring magnets.

14. The apparatus of claim 8, wherein the ring magnets within the external array of ring magnets have magnetic fields selected and arranged to enhance a magnetic field produced by the external array of magnets within the coils of the array of coils relative to a field radially outside of the external array of ring magnets and wherein the ring magnets within the internal array of ring magnets have magnetic fields selected and arranged to enhance a magnetic field produced by the internal array of magnets within the coils of the array of coils relative to a field radially inside of the internal array of ring magnets.

15. The apparatus of claim 1, further comprising a shuttle within the conduit, said shuttle comprising the internal magnet assembly, wherein the shuttle blocks the conduit so that fluid cannot pass through the conduit from one side of the shuttle to another side of the shuttle.

16. A linear actuator comprising:
a cylinder having a fluid impermeable wall;
an array of coils, wherein each coil of the array of coils is wound around the cylinder; and
an actuator assembly including an array of external ring magnets and an array of internal ring magnets, each ring magnet of the array of external ring magnets encircling the array of coils and each ring magnet of the array of internal ring magnets located within the cylinder, and wherein the array of internal ring magnets is aligned with and movable relative to the array of external ring magnets and wherein the array of internal ring magnets is also magnetically coupled with the array of external ring magnets so that the arrays of external and internal ring magnets move together along the array of coils in response drive signals applied to the coils within the array of coils.

17. An apparatus comprising:
an array of coils wherein each coil of the array of coils is wound around a core region for containing a fluid;
an external magnet assembly mounted outside of the array of coils and movable over the array of coils, wherein the external magnet assembly comprises an array of external ring magnets, each ring magnet of the array of external ring magnets encircling the array of coils, and wherein the ring magnets of the array of external ring magnets are grouped to form a first sub-array of external ring magnets and a second sub-array of external ring magnets, said first and second sub-arrays of external ring magnets being separately movable along the array of coils under control of signals applied to the coils of the array of coils; and
an internal magnet assembly mounted inside the core region around which the coils of the array of coils are wound, wherein the internal magnet assembly is aligned with and magnetically coupled to the external magnet assembly so that the external and internal magnet assemblies move together along the array of coils in response drive signals applied to the coils within the array of coils.

18. The apparatus of claim 17, wherein the internal magnet assembly comprises an array of internal ring magnets aligned with the array of external ring magnets.

19. The apparatus of claim 18, wherein the ring magnets of the array of internal ring magnets are grouped to form a first sub-array of internal ring magnets and a second sub-array of internal ring magnets, said first and second sub-arrays of internal ring magnets being separately movable within the core region under control of signals applied to the coils of the array of coils.

20. The apparatus of claim 19, wherein the first sub-array of external ring magnets and the first sub-array of internal ring magnets are magnetically coupled and move together and wherein the second sub-array of external ring magnets and the second sub-array of internal ring magnets are magnetically coupled and move together.

21. The apparatus of claim 20, further comprising a valve mechanism for controlling a flow of fluid through the internal magnet assembly and operated by a movement of the first and second sub-arrays of internal ring magnets relative to each other.

22. The apparatus of claim 18, wherein the ring magnets within the external array of ring magnets have magnetic fields selected and arranged to enhance a magnetic field produced by the external array of magnets within the coils of the array of coils relative to a field radially outside of the external array of ring magnets and wherein the ring magnets within the internal array of ring magnets have magnetic fields selected and arranged to enhance a magnetic field produced by the internal array of magnets within the coils of the array of coils relative to a field radially inside of the internal array of ring magnets.

* * * * *